US012738477B2

(12) United States Patent
Chen et al.

(10) Patent No.: US 12,738,477 B2
(45) Date of Patent: Sep. 15, 2026

(54) NEGATIVE ELECTRODE PLATE, SECONDARY BATTERY, BATTERY MODULE, BATTERY PACK, AND ELECTRICAL DEVICE

(71) Applicant: CONTEMPORARY AMPEREX TECHNOLOGY (HONG KONG) LIMITED, Hong Kong (CN)

(72) Inventors: Binyi Chen, Ningde City (CN); Jiazheng Wang, Ningde City (CN); Qingwei Yan, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 728 days.

(21) Appl. No.: 18/182,403

(22) Filed: Mar. 13, 2023

(65) Prior Publication Data

US 2023/0216028 A1 Jul. 6, 2023

Related U.S. Application Data

(63) Continuation of application No. PCT/CN2021/114579, filed on Aug. 25, 2021.

(51) Int. Cl.
*H01M 4/134* (2010.01)
*H01M 4/133* (2010.01)
(Continued)

(52) U.S. Cl.
CPC ........... *H01M 4/364* (2013.01); *H01M 4/133* (2013.01); *H01M 4/134* (2013.01); *H01M 4/38* (2013.01);
(Continued)

(58) Field of Classification Search
None
See application file for complete search history.

(56) References Cited

U.S. PATENT DOCUMENTS

2021/0111410 A1 4/2021 Huang et al.
2021/0119203 A1 * 4/2021 Kim ...................... H01M 4/366
(Continued)

FOREIGN PATENT DOCUMENTS

CN 100539257 C 9/2009
CN 107026270 A 8/2017
(Continued)

OTHER PUBLICATIONS

The Request for the Submission of an Opinion received in the counterpart Korean Application 10-2023-7001572, mailed on Jan. 23, 2025.

(Continued)

*Primary Examiner* — Yoshitoshi Takeuchi
(74) *Attorney, Agent, or Firm* — K&L Gates LLP

(57) ABSTRACT

A negative electrode plate, a secondary battery, a battery module, a battery pack, and an electrical device are provided. The negative electrode plate includes a negative current collector and a negative film layer disposed on the negative current collector. The negative film layer includes a first negative film layer and a second negative film layer. The second negative film layer is located between the negative current collector and the first negative film layer. The second negative film layer includes a metal element M, and an atomic radius $r_M$ of M and an atomic radius $r_{Li}$ of Li satisfy $$0 < \left|\frac{r_M - r_{Li}}{r_{Li}}\right| \times 100\% \leq 12\%.$$

(Continued)

This application can effectively suppress precipitation of lithium metal on the surface of the negative electrode plate, and significantly improve kinetic performance, cycle performance, and safety performance of the secondary battery.

20 Claims, 4 Drawing Sheets

(51) Int. Cl.

| | |
|---|---|
| ***H01M 4/36*** | (2006.01) |
| ***H01M 4/38*** | (2006.01) |
| ***H01M 4/587*** | (2010.01) |
| *H01M 4/02* | (2006.01) |

(52) U.S. Cl.

CPC ...... *H01M 4/587* (2013.01); *H01M 2004/027* (2013.01)

(56) References Cited

U.S. PATENT DOCUMENTS

| | | | | |
|---|---|---|---|---|
| 2021/0143412 | A1 * | 5/2021 | Lee | H01M 10/0562 |
| 2021/0155484 | A1 | 5/2021 | Zhamu et al. | |
| 2021/0257606 | A1 * | 8/2021 | Kim | H01M 10/052 |

FOREIGN PATENT DOCUMENTS

| | | | |
|---|---|---|---|
| CN | 107910496 | A | 4/2018 |
| CN | 112563559 | A | 3/2021 |
| CN | 112736217 | A | 4/2021 |
| CN | 112786948 | A | 5/2021 |
| CN | 113013379 | A | 6/2021 |
| JP | 2001006681 | A | 1/2001 |
| JP | 2002015729 | A | 1/2002 |
| JP | 2006216336 | A | 8/2006 |
| JP | 2010238426 | A | 10/2010 |
| JP | 2014199714 | A | 10/2014 |
| JP | 2019053860 | A | 4/2019 |
| JP | 2020167146 | A | 10/2020 |
| JP | 2021068706 | A | 4/2021 |
| JP | 2021077644 | A | 5/2021 |
| KR | 20210057270 | A | 5/2021 |

OTHER PUBLICATIONS

The extended European Search Report received in the corresponding European Application 21943336.4, mailed May 16, 2024.

"A Basic Guide to Particle Characterization", Malvern Instruments Worldwide—White Paper, May 2, 2012 (May 2, 2012), pp. 1-26, XP055089322.

The Notice of Reasons for Refusal received in the corresponding Japanese application 2023-501829, mailed Feb. 26, 2024.

The first office action received in the corresponding Chinese Application 202180006932.5, mailed on Jun. 13, 2024.

The Notice of Reasons for Refusal received in the corresponding Japanese application 2023-501829, mailed on Aug. 5, 2024.

International Search Report and Written Opinion received in the corresponding International Application PCT/CN2021/114579, mailed Mar. 25, 2022.

* cited by examiner

NEGATIVE ELECTRODE PLATE, SECONDARY BATTERY, BATTERY MODULE, BATTERY PACK, AND ELECTRICAL DEVICE

CROSS-REFERENCE TO RELATED APPLICATIONS

The present application is a continuation of International Application PCT/CN2021/114579, filed Aug. 25, 2021 and entitled "NEGATIVE ELECTRODE PLATE, SECONDARY BATTERY, BATTERY MODULE, BATTERY PACK, AND ELECTRICAL DEVICE", which is incorporated herein by reference in its entirety.

TECHNICAL FIELD

This application relates to the technical field of secondary batteries, and in particular, to a negative electrode plate, a secondary battery, a battery module, a battery pack, and an electrical device.

BACKGROUND

In recent years, with the application and popularization of secondary batteries in various electronic products and the industrial sectors such as new energy vehicles, an energy density of a secondary battery is increasingly a matter of concern. However, during a high-rate charging process of the secondary battery, lithium plating inevitably occurs on a surface of a negative electrode plate. In addition, in a case of overcharging the secondary battery, the lithium plating also occurs on the surface of the negative electrode plate.

SUMMARY

An objective of this application is to provide a negative electrode plate, a secondary battery, a battery module, a battery pack, and an electrical device, so as to solve the problem of lithium plating caused by high-rate charging and overcharging of the secondary battery, effectively suppress precipitation of lithium metal on a surface of the negative electrode plate, and significantly improve kinetic performance, cycle performance and safety performance of the secondary battery.

A first aspect of this application provides a negative electrode plate. The negative electrode plate includes a negative current collector and a negative film layer disposed on the negative current collector. The negative film layer includes a first negative film layer and a second negative film layer. The second negative film layer is located between the negative current collector and the first negative film layer. The second negative film layer includes a metal element M, and an atomic radius $r_M$ of M and an atomic radius $r_{Li}$ of Li satisfy $$0 < \left|\frac{r_M - r_{Li}}{r_{Li}}\right| \times 100\% \leq 12\%.$$

The negative film layer according to this application is a multi-layered structure. The second negative film layer includes a metal element M. The atomic radius differs little between M and Li, and a lattice mismatch degree is low between M and Li. Therefore, Li is more prone to dissolve on the surface of M to form a solid solution. When the secondary battery is charged at a high rate or overcharged, the surface of M can serve as a preferred nucleation site for lithium metal, and induce the lithium metal to precipitate on the surface of M of the second negative film layer, thereby effectively suppressing precipitation of the lithium metal on the surface of the negative electrode plate, and improving the kinetic performance, cycle performance, and safety performance of the secondary battery. In a case that the atomic radius differs little between M and Li, the lattice structure of M more matches the lattice structure of Li, and Li is more induced to nucleate on the surface of M, thereby being more effective in suppressing the precipitation of lithium metal on the surface of the negative electrode plate. The negative electrode plate according to this application can effectively suppress the precipitation of lithium metal on the surface of the negative electrode plate. Therefore, the secondary battery achieves not only high kinetic performance, but also significantly improved cycle life.

In any embodiment of this application, an atomic radius $r_M$ of M and an atomic radius $r_{Li}$ of Li satisfy $$0 < \left|\frac{r_M - r_{Li}}{r_{Li}}\right| \times 100\% \leq 6\%.$$

The difference of the atomic radius between M and Li is controlled to fall within an appropriate range, thereby more effectively suppressing the precipitation of lithium metal on the surface of the negative electrode plate, and further improving the kinetic performance, cycle performance, and safety performance of the secondary battery.

In any embodiment of this application, M is one or more selected from Sn, Bi, Cd, Ti, Nb, Ta, Sb, Hf, Mg, Zr, Ag, Au, Al, Sc, Mo, W, Pt, Pd, In, Re, Ir, Ga, Os, V, Zn, Ru, or Rh. Optionally, M is one or more selected from Sn, Bi, Cd, Ti, Nb, Ta, Sb, Hf, Mg, Zr, Ag, Au, or Al.

When M is selected from the foregoing metal elements, the lattice structure of M more matches the lattice structure of Li, and Li is more induced to nucleate on the surface of M, thereby being more effective in suppressing the precipitation of lithium metal on the surface of the negative electrode plate, and further improving the kinetic performance, cycle performance, and safety performance of the secondary battery.

In any embodiment of this application, M is located in at least a body portion of the negative film layer.

In any embodiment of this application, the second negative film layer includes an opposite first surface and second surface along a thickness direction of the second negative film layer. The first surface is disposed back from the negative current collector. The second surface is disposed toward the negative current collector. M is located in the first surface that is of the second negative film layer and that is back from the negative current collector, and/or, the second surface that is of the second negative film layer and that is oriented toward the negative current collector.

In any embodiment of this application, based on a total mass of the second negative film layer, a mass percent of M is 3% to 7%. Optionally, the mass percent of M is 3% to 5%.

The mass percent of M falls within an appropriate range, thereby effectively suppressing shortening of the cycle life of the secondary battery while effectively suppressing the precipitation of lithium metal on the surface of the negative electrode plate.

In any embodiment of this application, based on a total mass of the first negative film layer, a mass percent of M is less than or equal to 0.5%.

In any embodiment of this application, the first negative film layer contains no metal element M.

When the first negative film layer contains no or little metal element M, it is effectively ensured that lithium metal is preferentially precipitated on the surface of M of the second negative film layer, thereby further suppressing the precipitation of lithium metal on the surface of the negative electrode plate. In addition, lithium metal is preferentially precipitated on the surface of M of the second negative film layer, and the first negative film layer on the surface of the second negative film layer can serve a function of suppressing rapid growth of lithium dendrites, thereby further prolonging the cycle life of the secondary battery.

In any embodiment of this application, a coating weight ratio between the first negative film layer and the second negative film layer is 0.3 to 1.2. Optionally, the coating weight ratio between the first negative film layer and the second negative film layer is 0.5 to 0.8.

The coating weight ratio between the first negative film layer and the second negative film layer falls within an appropriate range, thereby not only effectively suppressing the precipitation of lithium metal on the surface of the negative electrode plate, but also effectively inhibiting lithium dendrites from reaching the surface of the negative electrode plate.

In any embodiment of this application, the second negative film layer includes a metal particle. The metal particle is one or more selected from a simple-substance particle of M or an alloy particle of M.

In any embodiment of this application, an alloy of M includes an alloy formed by at least two elements of M, and an alloy formed by one or more elements of M and one or more elements of another metal element $M^1$.

In any embodiment of this application, $M^1$ includes one or more of Fe, Cu, Ni, Cr, or Mn.

In any embodiment of this application, a volume median diameter $D_{v50}$ of the metal particle is less than or equal to 5 μm. Optionally, the volume median diameter $D_{v50}$ of the metal particle is less than or equal to 1 μm.

The volume median diameter $D_{v50}$ of the metal particle is controlled to fall within an appropriate range, thereby forming a sufficient number of nucleation sites in the second negative film layer, and in turn, effectively suppressing the precipitation of lithium metal on the surface of the negative electrode plate.

In any embodiment of this application, the second negative film layer includes one or more of a Li-M alloy particle or a Li-M-$M^1$ alloy particle, $M^1$ represents a metal element, and $M^1$ includes one or more of Fe, Cu, Ni, Cr, or Mn.

A second aspect of this application provides a secondary battery. The secondary battery includes the negative electrode plate according to the first aspect of this application.

A third aspect of this application provides a battery module. The battery module includes the secondary battery according to the second aspect of this application.

A fourth aspect of this application provides a battery pack. The battery pack includes the secondary battery according to the second aspect or the battery module according to the third aspect of this application.

A fifth aspect of this application provides an electrical device. The electrical device includes at least one of the secondary battery according to the second aspect, the battery module according to the third aspect, or the battery pack according to the fourth aspect of this application.

The battery module, the battery pack, and the electrical device according to this application include the secondary battery according to this application, and therefore, have at least the same advantages as the secondary battery.

BRIEF DESCRIPTION OF DRAWINGS

To describe the technical solutions in embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
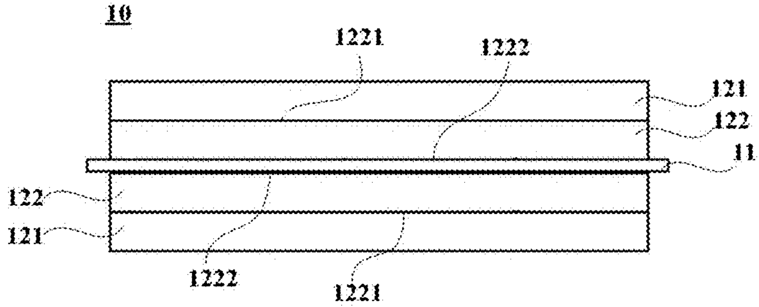
FIG. 1 is a schematic diagram of a negative electrode plate according to an embodiment of this application.

The drawings are not necessarily drawn to scale.

REFERENCE NUMERALS

1. Battery pack;
2. Upper box;
3. Lower box;
4. Battery module;
5. Secondary battery;
51. Housing;
52. Electrode assembly;
53. Cover plate;
10. Negative electrode plate;
11. Negative current collector;
121. First negative film layer;
122. Second negative film layer;
1221. First surface;
1222. Second surface.

DETAILED DESCRIPTION OF EMBODIMENTS

The following describes in detail a negative electrode plate, a secondary battery, a battery module, a battery pack, and an electrical device according to embodiments of this application with due reference to drawings. However, unnecessary details may be omitted in some cases. For example, a detailed description of a well-known matter or repeated description of a substantially identical structure may be omitted. That is intended to prevent the following descriptions from becoming unnecessarily long, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by selecting a lower limit and an upper limit. The selected lower and upper limits define the boundaries of the given range. A range so defined may be inclusive or exclusive of the end values, and may be arbitrarily combined. That is, any lower limit may be combined with any upper limit to form a range. For example, if a range of 60 to 120 and a range of 80 to 110 are listed for a given parameter, it is expectable that such ranges may be understood as 60 to 110 and 80 to 120. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, the numerical range "0 to 5" means that all real numbers between 0 and 5 inclusive are listed herein, and the range "0 to 5" is just a brief representation of combinations of such numbers. In addition, when a parameter is expressed as an integer greater than or equal to 2, the expression is equivalent to that the parameter is an integer such as 2, 3, 4, 5, 6, 7, 8, 9, 10, 11, 12, and the like.

Unless otherwise expressly specified herein, all embodiments and optional embodiments hereof may be combined with each other to form a new technical solution.

Unless otherwise expressly specified herein, all technical features and optional technical features hereof may be combined with each other to form a new technical solution.

Unless otherwise expressly specified herein, all the steps described herein may be performed sequentially or randomly, and preferably, performed sequentially. For example, that the method includes steps (a) and (b) indicates that the method may include steps (a) and (b) performed sequentially, or steps (b) and (a) performed sequentially. For example, that the method may further include step (c) indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion, and may also mean closed-ended inclusion. For example, the terms "include" and "comprise" may mean inclusion of other items not listed, or inclusion of only the listed items.

Unless otherwise expressly specified herein, the term "or" is inclusive. For example, the phrase "A or B" means "A alone, B alone, or both A and B." More specifically, the condition "A or B" is satisfied by any of the following: A is true (or existent) and B is false (or absent); A is false (or absent) and B is true (or existent); or, both A and B are true (or existent).

Secondary Battery

A secondary battery, also known as a rechargeable battery or storage battery, is a battery that is reusable after the active material is activated by charging the battery that has been discharged.

Generally, a secondary battery includes a positive electrode plate, a negative electrode plate, a separator, and an electrolyte. During charge and discharge of the secondary battery, intercalation and deintercalation of active ions (such as lithium ions) occur back and forth between the positive electrode plate and the negative electrode plate. Disposed between the positive electrode plate and the negative electrode plate, the separator mainly serves to prevent a short circuit between the positive electrode plate and the negative electrode plate, and is penetrable by the active ions. The electrolyte primarily serves to conduct the active ions between the positive electrode plate and the negative electrode plate.

Negative Electrode Plate

During charge of a secondary battery, lithium ions are deintercalated from a positive electrode and intercalated into a negative electrode. However, in a case that the secondary battery is charged at a high rate or overcharged, some consequences are prone to occur. For example, the space for intercalating the lithium ions in the negative electrode is not enough, and the lithium ions are deintercalated too rapidly to be intercalated into the negative electrode in time in the same amount. The lithium ions that are not intercalated into the negative electrode in time have to gain electrons from the surface of the negative electrode plate and be reduced to form lithium metal, resulting in a phenomenon of lithium plating. In addition, in a case that the secondary battery is charged at a high rate or overcharged, the negative electrode is severely polarized. When a surface potential of the negative electrode plate keeps dropping until lower than a potential of a $Li/Li^+$ reference electrode, the lithium ions gain electrons on the surface of the negative electrode plate and are reduced to form lithium metal. The lithium plating deteriorates the performance of the secondary battery, for example, shortens the cycle life drastically. In addition, after the lithium plating phenomenon lasts for a period, the lithium metal grows into a tree-like structure, that is, lithium dendrites. The growth of the lithium dendrites destroys a solid electrolyte interphase (SEI) film on a surface of a negative active material, and results in irreversible consumption of active ions. Further, the growth of lithium dendrites is prone to pierce the separator to cause an internal short circuit, or even pose safety hazards such as fire and explosion. The inventor hereof finds that a main reason of lithium plating is: the negative active material is usually a lithium-intercalation-type material, and a lithium intercalation speed of the lithium-intercalation-type material is too low to meet high-rate charging requirements of the secondary battery. In addition, in a case that the secondary battery is overcharged, the lithium-intercalation-type material is hardly capable of precluding the lithium metal from being generated on the surface of the negative electrode plate, thereby resulting in high safety hazards of the secondary battery.

In order to solve the problem of lithium plating of the secondary battery charged at a high rate or overcharged and consequential problems such as shortened cycle life and increased safety hazards of the secondary battery, the inventor has further carried out a lot of research, and discloses a negative electrode plate. The electrode plate can effectively suppress the precipitation of lithium metal on the surface of the negative electrode plate, so as to significantly improve the kinetic performance, cycle performance, and safety performance of the secondary battery, and especially, to improve the cycle performance and safety performance of the secondary battery charged at a high rate and overcharged.

The negative electrode plate according to this application includes a negative current collector and a negative film layer disposed on the negative current collector. The negative film layer includes a first negative film layer and a second negative film layer. The second negative film layer is located between the negative current collector and the first negative film layer. The second negative film layer includes a metal element M, and an atomic radius $r_M$ of M and an atomic radius $r_{Li}$ of Li satisfy $$0 < \left|\frac{r_M - r_{Li}}{r_{Li}}\right| \times 100\% \leq 12\%.$$

The negative film layer according to this application is a multi-layered structure. The second negative film layer includes a metal element M. The atomic radius differs little between M and Li, and a lattice mismatch degree is low between M and Li. Therefore, Li is more prone to dissolve on the surface of M to form a solid solution. The inventor finds that, after Li dissolves on the surface of M, the crystal structure of the formed solid solution is similar to the crystal structure of Li, so that the interfacial energy for nucleating Li on the surface of M is relatively low. The interfacial energy is a source of nucleation resistance. When a surface nucleation resistance of M is lower, the surface of M can serve as a preferred nucleation site for lithium metal, and the lithium metal is induced to precipitate on the surface of M rather than on the surface of the negative electrode plate.

When the secondary battery is charged at a high rate or overcharged, the negative electrode is polarized severely. When a surface potential of the negative electrode plate is about to be as low as a lithium plating overpotential, because a surface nucleation resistance of M contained in the second negative film layer is even lower, the lithium plating overpotential on the surface is lower than the surface potential of the negative electrode plate. Therefore, the surface of M can serve as a preferred nucleation site for lithium metal, and induce the lithium metal to precipitate on the surface of M of the second negative film layer, thereby effectively suppressing precipitation of the lithium metal on the surface of the negative electrode plate, and improving the kinetic performance, cycle performance, and safety performance of the secondary battery.

In a case that the atomic radius differs little between M and Li, the lattice structure of M more matches the lattice structure of Li, and Li is more induced to nucleate on the surface of M, thereby being more effective in suppressing the precipitation of lithium metal on the surface of the negative electrode plate. In a case that the atomic radius differs sharply between M and Li, for example, if the atomic radius difference is greater than 12%, the degree of lattice mismatch between M and Li is relatively high, and the surface of M is not suitable for serving as a preferred nucleation site for lithium metal, and is unable to induce lithium metal to nucleate on the surface of M in the second negative film layer first. When the secondary battery is charged at a high rate or overcharged, lithium metal still precipitates on the surface of the negative electrode plate, and the safety performance of the secondary battery is not effectively ensured.

The negative electrode plate according to this application enables safe use of a conventional negative active material of a secondary battery charged at a high rate or overcharged. The negative electrode plate according to this application can effectively suppress the precipitation of lithium metal on the surface of the negative electrode plate. Therefore, the secondary battery achieves not only high kinetic performance, but also significantly improved cycle life.

In this application, the atomic radii of the metal elements M and Li can be learned by referring to *Lange's Handbook of Chemistry* (Lange's handbook of chemistry).

In some embodiments, the atomic radius $r_M$ of M and the atomic radius $r_{Li}$ of Li satisfy $$0 < \left|\frac{r_M - r_{Li}}{r_{Li}}\right| \times 100\% \leq 6\%.$$

The difference of the atomic radius between M and Li is controlled to fall within an appropriate range, thereby more effectively suppressing the precipitation of lithium metal on the surface of the negative electrode plate, and further improving the kinetic performance, cycle performance, and safety performance of the secondary battery.

In some embodiments, based on a total mass of the first negative film layer, a mass percent of M is less than or equal to 0.5%. Optionally, the first negative film layer contains no metal element M.

When the first negative film layer contains no or little metal element M, it is effectively ensured that lithium metal is preferentially precipitated on the surface of M of the second negative film layer, thereby further suppressing the precipitation of lithium metal on the surface of the negative electrode plate. In addition, lithium metal is preferentially precipitated on the surface of M of the second negative film layer, and the first negative film layer on the surface of the second negative film layer can serve a function of suppressing rapid growth of lithium dendrites, thereby further prolonging the cycle life of the secondary battery.

In some embodiments, based on a total mass of the second negative film layer, a mass percent of M is 1% to 10%. Optionally, the mass percent of M is 1% to 9%, 1% to 8%, 1% to 7%, 1% to 6%, 1% to 5%, 1% to 4%, 2% to 9%, 2% to 8%, 2% to 7%, 2% to 6%, 2% to 5%, 2% to 4%, 3% to 9%, 3% to 8%, 3% to 7%, 3% to 6%, 3% to 5%, 3% to 4%, 3.5% to 9%, 3.5% to 8%, 3.5% to 7%, 3.5% to 6%, 3.5% to 5%, or 3.5% to 4.5%.

When the mass percent of M is relatively low, few nucleation sites are available on the second negative film layer. When the secondary battery is charged at a high rate or overcharged, the second negative film layer is not obviously effective in suppressing the precipitation of lithium metal on the surface of the negative electrode plate. When the mass percent of M is relatively high, electrolyte consumption also increases. Due to volume expansion of M after Li dissolves on the surface of M to form a solid solution, the volumes of the second negative film layer and the negative electrode plate expand to a greater extent, and the cycle life of the secondary battery is shortened to some extent. The mass percent of M falls within an appropriate range, thereby effectively suppressing shortening of the cycle life of the secondary battery while effectively suppressing the precipitation of lithium metal on the surface of the negative electrode plate.

In some embodiments, M is one or more selected from Sn, Bi, Cd, Ti, Nb, Ta, Sb, Hf, Mg, Zr, Ag, Au, Al, Sc, Mo, W, Pt, Pd, In, Re, Ir, Ga, Os, V, Zn, Ru, or Rh. Optionally, M is one or more selected from Sn, Bi, Cd, Ti, Nb, Ta, Sb, Hf, Mg, Zr, Ag, Au, or Al. Further optionally, M is one or more selected from Nb, Au, Ag, Al, Mg, Ti, Cd, or Zr.

When M is selected from the foregoing metal elements, the lattice structure of M more matches the lattice structure of Li, and Li is more induced to nucleate on the surface of M, thereby being more effective in suppressing the precipitation of lithium metal on the surface of the negative electrode plate, and further improving the kinetic performance, cycle performance, and safety performance of the secondary battery.

In some embodiments, the second negative film layer includes a body portion and an opposite first surface and second surface along a thickness direction of the second negative film layer. The first surface is disposed back from the negative current collector, and the second surface is disposed toward the negative current collector. M is located in one or more of the following positions: the body portion of the second negative film layer, the first surface that is of the second negative film layer and that is back from the negative current collector, and the second surface that is of the second negative film layer and that is oriented toward the negative current collector. Here are examples: (1) M is just located in the body portion of the negative film layer; (2) M is just located in the first surface that is of the second negative film layer and that is back from the negative current collector; (3) M is just located in the second surface that is of the second negative film layer and that is oriented toward the negative current collector; (4) M is located in both the body portion of the negative film layer and the first surface that is of the second negative film layer and that is back from the negative current collector; (5) M is located in both the body portion of the negative film layer and the second surface that is of the second negative film layer and that is oriented toward the negative current collector; (6) M is located in both the first surface that is of the second negative film layer and that is back from the negative current collector, and the second surface that is of the second negative film layer and that is oriented toward the negative current collector; and (7) M is located in three positions concurrently: the body portion of the negative film layer, the first surface that is of the second negative film layer and that is back from the negative current collector, and the second surface that is of the second negative film layer and that is oriented toward the negative current collector.

In some embodiments, M is located in at least the body portion of the second negative film layer.

In some embodiments, when M is located in the first surface that is of the second negative film layer and that is back from the negative current collector, M can form a layered structure on the first surface of the second negative film layer. Optionally, the layered structure is discontinuous. For example, M is distributed at intervals or in an array on the first surface of the second negative film layer. In this case, on the one hand, the electrolytic solution is facilitated to infiltrate the second negative film layer thoroughly. On the other hand, the lithium ions from the positive electrode are facilitated to be intercalated into the second negative film layer smoothly during charge of the secondary battery, and the lithium ions intercalated in the second negative film layer are facilitated to be thoroughly deintercalated and smoothly migrated to the positive electrode during discharge of the secondary battery.

In some embodiments, when M is located in the second surface that is of the second negative film layer and that is oriented toward the negative current collector, M can form a layered structure on the second surface of the second negative film layer. Optionally, the layered structure is discontinuous. For example, M is distributed at intervals or in an array on the second surface of the second negative film layer. In this case, on the one hand, it is convenient to maintain relatively high bonding strength between the second negative film layer and the negative current collector to prevent detachment of coating. On the other hand, electron transfer is facilitated.

In some embodiments, a coating weight ratio between the first negative film layer and the second negative film layer is 0.3 to 1.2. Optionally, the coating weight ratio between the first negative film layer and the second negative film layer is 0.3 to 1, 0.4 to 1, 0.5 to 1, 0.3 to 0.8, 0.4 to 0.8, 0.5 to 0.8, 0.3 to 0.7, 0.4 to 0.7, 0.5 to 0.7, 0.3 to 0.6, 0.4 to 0.6, or 0.5 to 0.6.

When the coating weight ratio between the first negative film layer and the second negative film layer is relatively high, relatively few nucleation sites are available on the second negative film layer, and the effect of suppressing the precipitation of lithium metal on the surface of the negative electrode plate is not obvious. When the coating weight ratio between the first negative film layer and the second negative film layer is relatively low, the thickness of the first negative film layer is relatively small, the lithium dendrites formed by the second negative film layer are more prone to pierce the first negative film layer and reach the surface of the negative electrode plate, and the risk of an internal short circuit of the battery increases. The coating weight ratio between the first negative film layer and the second negative film layer falls within an appropriate range, thereby not only effectively suppressing the precipitation of lithium metal on the surface of the negative electrode plate, but also effectively inhibiting lithium dendrites from reaching the surface of the negative electrode plate.

In some embodiments, the second negative film layer may include a metal particle. The metal particle is one or more selected from a simple-substance particle of M or an alloy particle of M.

In some embodiments, an alloy of M includes an alloy formed by at least two elements of M, and an alloy formed by one or more elements of M and one or more elements of another metal element $M^1$. Optionally, the alloy of M includes an alloy formed by at least two elements of M.

In some embodiments, $M^1$ includes one or more of Fe, Cu, Ni, Cr, or Mn.

In some embodiments, a volume median diameter $D_{v50}$ of the metal particle is less than or equal to 5 μm. Optionally, the volume median diameter $D_{v50}$ of the metal particle is less than or equal to 1 μm. More specifically, the volume median diameter $D_{v50}$ of the metal particle is less than or equal to 0.5 μm.

The volume median diameter $D_{v50}$ of the metal particle is controlled to fall within an appropriate range, thereby forming a sufficient number of nucleation sites in the second negative film layer, and in turn, effectively suppressing the precipitation of lithium metal on the surface of the negative electrode plate.

In this application, the volume median diameter $D_{v50}$ of the material has the meaning well known in the art, and can be determined by the method and instrument known in the art. For example, the volume median diameter may be measured by using a laser particle size analyzer (such as Mastersizer 2000E manufactured by Britain-based Malvern Instruments Ltd.) by reference to the GB/T 19077-2016 particle size distribution laser diffraction method.

In some embodiments, the second negative film layer may include one or more of a Li-M alloy particle or a Li-M-$M^1$ alloy particle, $M^1$ represents a metal element, and $M^1$ includes one or more of Fe, Cu, Ni, Cr, or Mn. The Li-M alloy means an alloy formed by Li and one or more of the metal elements M. The Li-M-$M^1$ alloy means alloy formed by Li, one or more of the metal elements M, and one or more of the metal elements $M^1$.

As an example, the Li-M alloy is one or more of Li—Sn, Li—Bi, Li—Cd, Li—Ti, Li—Nb, Li—Ta, Li—Sb, Li—Hf, Li—Mg, Li—Zr, Li—Ag, Li—Au, Li—Al, Li—Sc, Li—Mo, Li—W, Li—Pt, Li—Pd, Li—In, Li—Re, Li—Ir, Li—Ga, Li—Os, Li—V, Li—Zn, Li—Ru, Li—Rh, Li—Mg—Al, Li—Mg—Zr, Li—Mg—Zn, Li—Ag—Al, Li—Ag—Zn, Li—Ag—Mg, or Li—Ti—Al.

As an example, the Li-M-$M^1$ alloy is one or more selected from Li—Mg—Mn, Li—Al—Mn, Li—Al—Fe, Li—Al—Cu, Li—Ti—Ni, or Li—Ti—Cr.

In some embodiments, the second negative film layer may include a second negative active material, an optional conductive agent, an optional binder, and other optional agents in addition to one or more of the metal particles, the Li-M alloy particle, and the Li-M-$M^1$ alloy particle.

In some embodiments, the first negative film layer includes a first negative active material, an optional conductive agent, an optional binder, and other optional agents.

In some embodiments, the types of the first negative active material and the second negative active material are not particularly limited, and may be any negative active materials that are well known in the art for use in a secondary battery. The type of the first negative active material may be identical to or different from the type of the second negative active material. As an example, the first negative active material and the second negative active material each independently include one or more of graphite, soft carbon, hard carbon, mesocarbon microbeads, carbon fibers, carbon nanotubes, silicon-based materials, tin-based materials, or lithium titanium oxide. The silicon-based material may include one or more of simple-substance silicon, oxide of silicon, silicon-carbon composite, silicon-nitrogen composite, or silicon alloy. The tin-based material may include one or more of simple-substance tin, oxide of tin, or tin alloy. This application is not limited to such materials, and other conventional well-known materials usable as a negative active material of a secondary battery may be used instead. One of the negative active materials may be used alone, or at least two thereof may be combined and used together.

In some embodiments, the type and content of the conductive agent and the binder are not particularly limited, and may be selected according to actual needs. The type of the conductive agent may be identical or different between the first negative film layer and the second negative film layer. As an example, the conductive agent may include one or more of superconductive carbon, carbon black (such as acetylene black and Ketjen black), carbon dots, carbon nanotubes, graphene, or carbon nanofibers. The type of the binder may be identical or different between the first negative film layer and the second negative film layer. As an example, the binder may include styrene-butadiene rubber (SBR), water-soluble unsaturated resin SR-1B, water-based acrylic resin (for example, polyacrylic acid PAA, polymethacrylic acid PMAA, and polyacrylic acid sodium PAAS), polyacrylamide (PAM), polyvinyl alcohol (PVA), sodium alginate (SA), or carboxymethyl chitosan (CMCS). The types of other optional agents may be identical or different between the first negative film layer and the second negative film layer. As an example, other optional agents may include a thickener (such as sodium carboxymethyl cellulose CMC-Na), a positive temperature coefficient (PTC) thermistor material, and the like.

In the negative electrode plate according to this application, the negative current collector may be a metal foil or a composite current collector. As an example of the metal foil, the negative current collector may be a copper foil. The composite current collector may include a polymer material base layer and a metal material layer formed on at least one surface of the polymer material base layer. As an example, the metal material may be one or more selected from copper, copper alloy, nickel, nickel alloy, titanium, titanium alloy, silver, or silver alloy. As an example, the polymer material base layer may be selected from polypropylene (PP), polyethylene terephthalate (PET), polybutylene terephthalate (PBT), polystyrene (PS), polyethylene (PE), and the like.

In some embodiments, the negative film layer is disposed on at least one surface of the negative current collector. For example, the negative current collector includes two surfaces opposite to each other in a thickness direction thereof. The negative film layer is disposed on either or both of the two opposite surfaces of the negative current collector.

FIG. 1 is a schematic diagram of a negative electrode plate 10 according to an embodiment of this application. The negative electrode plate 10 may include a negative current collector 11, a second negative film layer 122 disposed on both sides of the negative current collector 11, and a first negative film layer 121 disposed on the second negative film layer 122. The second negative film layer 122 is located between the negative current collector 11 and the first negative film layer 121. The second negative film layer 122 includes an opposite first surface 1221 and second surface 1222 along a thickness direction thereof. The first surface 1221 is disposed back from the negative current collector 11, and the second surface 1222 is disposed toward the negative current collector 11.

Definitely, the negative electrode plate 10 according to this application may be implemented in other manners. For example, the negative electrode plate 10 includes the negative current collector 11, the second negative film layer 122 disposed on one side of the negative current collector, and the first negative film layer 121 disposed on the second negative film layer 122.

In addition, the negative electrode plate according to this application does not exclude other additional functional layers other than the negative film layer. For example, in some embodiments, the negative electrode plate according to this application may further include a conductive base layer (for example, the conductive base layer includes a conductive agent and a binder) disposed between the negative current collector and the second negative film layer. In other embodiments, the negative electrode plate according to this application further includes a protection layer overlaying the surface of the first negative film layer.

In some embodiments, the method for preparing a negative electrode plate according to this application may include the following steps: forming a second negative film layer on at least one side of the negative current collector, where the second negative film layer includes a metal particle, and the metal particle is one or more selected from a simple-substance particle of M or an alloy particle of M; and forming a first negative film layer on the surface of the second negative film layer.

The negative film layer is generally formed by coating the negative current collector with a negative slurry and then performing drying and cold pressing. The negative slurry is generally formed by dispersing a negative active material, an optional conductive agent, an optional binder, other optional agents, and the like into a solvent and then stirring well. The solvent may be, but without being limited to, N-methylpyrrolidone (NMP) or deionized water. In some embodiments, a first negative slurry may be formed by dispersing a first negative active material, an optional conductive agent, an optional binder, and other optional agents into a solvent and stirring well, and a second negative slurry may be formed by dispersing a second negative active material, a metal particle, an optional conductive agent, an optional binder, and other optional agents into a solvent and stirring well.

In the method for preparing the negative electrode plate, the first negative slurry and the second negative slurry may be applied simultaneously at one time, or may be applied separately twice.

In some embodiments, the first negative slurry and the second negative slurry are applied simultaneously at one time. Applying at one time improves the adhesion between the first negative film layer and the second negative film layer, helps reduce an overall interface resistance of the negative film layer, and further improves the cycle performance of the battery.

In some embodiments, the method for preparing the negative electrode plate may include the following steps: forming a second negative film layer on at least one side of the negative current collector, forming a layer of metal M on the surface of the second negative film layer, and then continuing to form a first negative film layer so that, after being cold-pressed, M is located on a first surface that is of the second negative film layer that is back from the negative current collector. Optionally, the layered structure of the metal M is in discontinuous form, for example, in a spaced distribution state or an array distribution state. The method for forming the metal M on the surface of the second negative film layer includes, but is not limited to, coating, shot blasting, spraying, vapor deposition, and the like. For example, the metal M is deposited on the surface of the second negative film layer by a vapor deposition method. The vapor deposition method may be one or more of atomic layer deposition, chemical vapor deposition, or physical vapor deposition.

In some embodiments, the method for preparing the negative electrode plate may include the following steps: forming a layer of metal M on at least one side of the negative current collector, and forming a second negative film layer on the surface of the negative current collector, and then forming a first negative film layer on the surface of the second negative film layer so that, after being cold-pressed, M is located on a second surface that is of the second negative film layer that is oriented toward the negative current collector. Optionally, the layered structure of the metal M is in discontinuous form, for example, in a spaced distribution state or an array distribution state. The method for forming the metal M on the surface of the negative current collector includes, but is not limited to, coating, vapor deposition, a gravure process, and the like. For example, the metal M is deposited on the surface of the negative current collector by a vapor deposition method. The vapor deposition method may be one or more of atomic layer deposition, chemical vapor deposition, or physical vapor deposition.

The mass percent of M in the second negative film layer may be determined by the following test method:

Obtaining thicknesses of the first negative film layer and the second negative film layer separately by using a scanning electron microscope (such as ZEISS Sigma 300); first, cutting the negative electrode plate into a specimen of a given size (for example, 2 cm×2 cm), and fixing the negative electrode plate onto a specimen holder by using paraffin; and then loading the specimen holder onto the specimen rack and locking the rack, powering on an argon ion cross-section polisher (such as IB-19500CP) and performing vacuumizing (for example, at a pressure of $10^{-4}$ Pa), setting the argon flow (such as 0.15 MPa), voltage (such as 8 KV), and polishing duration (such as 2 hours), and adjusting the specimen holder to a wobble mode to start polishing. For details of the specimen test procedure, refer to JY/T010-1996. To ensure accuracy of test results, a plurality of (for example, 5) different regions are selected randomly from a specimen for scanning. The thicknesses of the first negative film layer and the second negative film layer in a specified test region are measured at a given magnification (such as, 500×) to obtain readouts. The readouts of a plurality of test regions are averaged out to serve as a test result.

The content of the metal element M in the second negative film layer is relatively low, and therefore, exerts little impact on the density of the second negative film layer. Therefore, it is considered that the density of the first negative film layer is consistent with the density of the second negative film layer. Further, the coating weight ratio between the first negative film layer and the second negative film layer can be obtained based on the thickness ratio between the first negative film layer and the second negative film layer.

A given size of specimen (for example, 2 cm×2 cm) is cut out of a single-side-coated and cold-pressed negative electrode plate (for a double-side-coated negative electrode plate, the negative film layer may be wiped off one side of the negative electrode plate first); and then powder is scraped off the specimen. All the obtained powder is tested with an inductively coupled plasma-optical emission spectrometer (inductively coupled plasma-Optical Emission spectrometers, ICP-OES) to obtain a mass concentration of the metal element M in the negative film layer. The mass percent of the metal element M in the second negative film layer is calculated based on the coating weight ratio between the first negative film layer and the second negative film layer. To ensure accuracy of the test result, the negative electrode plate may be cut into a plurality of (such as 5) specimens of a given size. An average value of the plurality of specimens is used as the test result.

Positive Electrode Plate

The secondary battery includes a positive electrode plate. The positive electrode plate generally includes a positive current collector and a positive film layer. The positive film layer is disposed on at least one surface of the positive current collector and includes a positive active material. For example, the positive current collector includes two surfaces opposite to each other in a thickness direction thereof. The positive film layer is disposed on either or both of the two opposite surfaces of the positive current collector.

In the positive electrode plate according to this application, the positive current collector may be a metal foil or a composite current collector. As an example of the metal foil, the positive current collector may be an aluminum foil. The composite current collector may include a polymer material base layer and a metal material layer formed on at least one surface of the polymer material base layer. As an example, the metal material may be one or more selected from aluminum, aluminum alloy, nickel, nickel alloy, titanium, titanium alloy, silver, or silver alloy. As an example, the polymer material base layer may be selected from polypropylene (PP), polyethylene terephthalate (PET), polybutylene terephthalate (PBT), polystyrene (PS), polyethylene (PE), and the like.

In the positive electrode plate according to this application, the positive film layer includes a positive active material. The positive active material may be a positive active material that is well known in the art for use in a secondary battery. As an example, the positive active material may include one or more of lithium transition metal oxide, olivine-structured lithium-containing phosphate, or a modified compound thereof. Examples of the lithium transition metal oxide include, but are not limited to, lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and a modified compound thereof. Examples of the olivine-structured lithium-containing phosphate include, but are not limited to, one or more of lithium iron phosphate, a composite of lithium iron phosphate and carbon, lithium manganese phosphate, a composite of lithium manganese phosphate and carbon, lithium manganese iron phosphate, or a composite of lithium manganese iron phosphate and carbon, and a modified compound thereof. This application is not limited to such materials, and other conventional well-known materials usable as a positive active material of a secondary battery may be used instead. One of the positive active materials may be used alone, or at least two thereof may be combined and used together.

In the positive electrode plate according to this application, the modified compound of each positive active material described above may be formed by modifying the positive active material, for example, by doping, surface coating, or both doping and surface coating.

In the positive electrode plate according to this application, the positive film layer generally includes a positive active material, an optional binder, and an optional conductive agent. The positive film layer is generally formed by coating the positive current collector with a positive slurry and then performing drying and cold pressing. The positive slurry is generally formed by dispersing a positive active material, an optional conductive agent, an optional binder, and any other ingredients into a solvent and then stirring well. The solvent may be, but without being limited to, N-methyl-pyrrolidone (NMP). As an example, the binder applicable to the positive film layer may include one or more of polyvinylidene difluoride (PVDF), polytetrafluoroethylene (PTFE), poly(vinylidene fluoride-co-tetrafluoroethylene-co-propylene), poly(vinylidene fluoride-co-hexafluoropropylene-co-tetrafluoroethylene), poly(tetrafluoroethylene-co-hexafluoropropylene), or fluorinated acrylate resin. As an example, the conductive agent applicable to the positive film layer may include one or more of superconductive carbon, acetylene black, carbon black, Ketjen black, carbon dots, carbon nanotubes, graphene, or carbon nanofibers. It needs to be noted that the composition or parameters of each positive film layer described in this application mean the composition or parameter range of a film layer on a single side of the positive current collector. When the positive film layer is disposed on two opposite surfaces of the positive current collector, the composition or parameters are considered to fall within the protection scope of this application as long as the composition or parameters of the positive film layer on any one of the surfaces satisfy this application.

Electrolyte

The electrolyte serves to conduct the active ions between the positive electrode plate and the negative electrode plate. The type of the electrolyte for the secondary battery is not particularly limited in this application, and may be selected as required. For example, the electrolyte may be at least one selected from a solid-state electrolyte or a liquid-state electrolyte (that is, electrolytic solution).

In some embodiments, the electrolyte is an electrolytic solution. The electrolytic solution includes an electrolyte salt and a solvent.

In some embodiments, the type of the electrolyte salt is not particularly limited, and may be selected according to actual needs. As an example, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluoro(oxalato)borate), LiBOB (lithium bis(oxalato)borate), $LiPO2F_2$ (lithium difluorophosphate), LiDFOP (lithium difluoro(bisoxalato)phosphate), or LiTFOP (lithium tetrafluoro(oxalato)phosphate).

In some embodiments, the type of the solvent is not particularly limited, and may be selected according to actual needs. As an example, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), or (ethylsulfonyl) ethane (ESE).

In some embodiments, optionally, the solvent is a non-aqueous solvent.

In some embodiments, the electrolytic solution further optionally includes an additive. For example, the additive may include a negative film-forming additive, a positive film-forming additive, and additives that can improve some performance of the battery, for example, an additive that improves overcharge performance of the battery, an additive that improves high-temperature performance of the battery, and an additive that improves low-temperature performance of the battery, and the like.

Separator

Secondary batteries that employ an electrolytic solution and some secondary batteries that employ a solid-state electrolyte also contain a separator. The separator is disposed between the positive electrode plate and the negative electrode plate to serve an isolation purpose. The type of the separator is not particularly limited in this application, and may be any well-known porous separator that is highly stable both chemically and mechanically. In some embodiments, the material of the separator may be one or more selected from glass fiber, non-woven fabric, polyethylene, polypropylene, or polyvinylidene difluoride. The separator may be a single-layer film or a multilayer composite film. When the separator is a multilayer composite film, materials in different layers may be identical or different.

In some embodiments, the positive electrode plate, the negative electrode plate, and the separator may be wound or stacked to form an electrode assembly.

In some embodiments, the secondary battery may include an outer package. The outer package may be configured to package the electrode assembly and the electrolyte.

In some embodiments, the outer package of the secondary battery may be a hard shell such as a hard plastic shell, an aluminum shell, a steel shell, or the like. Alternatively, the outer package of the secondary battery may be a soft package such as a pouch-type soft package. The material of the soft package may be plastic such as one or more of polypropylene (PP), polybutylene terephthalate (PBT), or polybutylene succinate (PBS).

Figure 2:
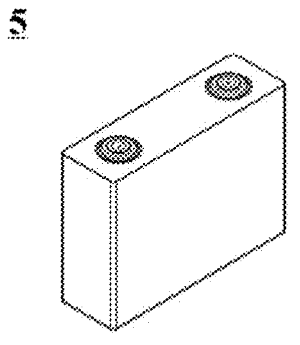
FIG. 2 is a schematic diagram of a secondary battery according to an embodiment of this application.

The shape of the secondary battery is not particularly limited in this application, and may be cylindrical, prismatic or any other shape. FIG. 2 shows a prismatic secondary battery 5 as an example.

Figure 3:
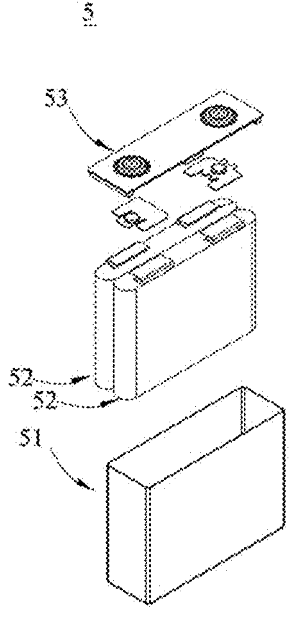
FIG. 3 is a schematic exploded view of a secondary battery according to an embodiment of this application.

In some embodiments, referring to FIG. 3, the outer package may include a housing 51 and a cover plate 53. The housing 51 may include a bottom plate and a side plate connected to the bottom plate. The bottom plate and the side plate close in to form an accommodation cavity. The housing 51 is equipped with an opening that communicates with the accommodation cavity. The cover plate 53 is configured to fit and cover the opening to close the accommodation cavity. The positive electrode plate, the negative electrode plate, and the separator may be wound or stacked to form the electrode assembly 52. The electrode assembly 52 is packaged in the accommodation cavity. The electrolytic solution serves a function of infiltration in the electrode assembly 52. The number of electrode assemblies 52 in the secondary battery 5 may be one or more, and is adjustable as required.

In some embodiments, the secondary battery may be assembled into a battery module. The battery module may contain a plurality of secondary batteries, and the specific quantity of the secondary batteries in a battery module may be adjusted according to the application requirements and capacity of the battery module.

Figure 4:
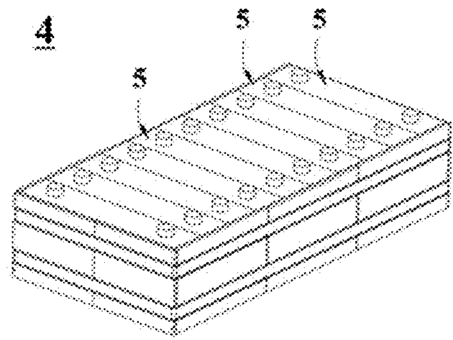
FIG. 4 is a schematic diagram of a battery module according to an embodiment of this application.

FIG. 4 shows a battery module 4 as an example. Referring to FIG. 4, in the battery module 4, a plurality of secondary batteries 5 may be arranged sequentially along a length direction of the battery module 4. Alternatively, the secondary batteries may be arranged in any other manner. Further, the plurality of secondary batteries 5 may be fixed by a fastener.

Optionally, the battery module 4 may further include a shell that provides an accommodation space. The plurality of secondary batteries 5 are accommodated in the accommodation space.

In some embodiments, the battery module may be assembled into a battery pack. The quantity of the battery modules contained in a battery pack may be adjusted according to the application requirements and the capacity of the battery pack.

Figure 5:
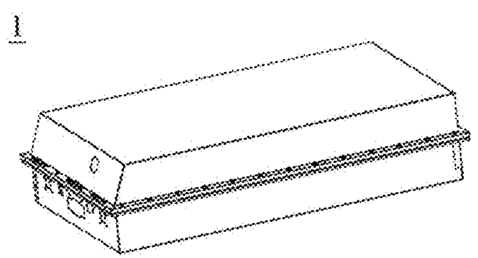
FIG. 5 is a schematic diagram of a battery pack according to an embodiment of this application.
Figure 6:
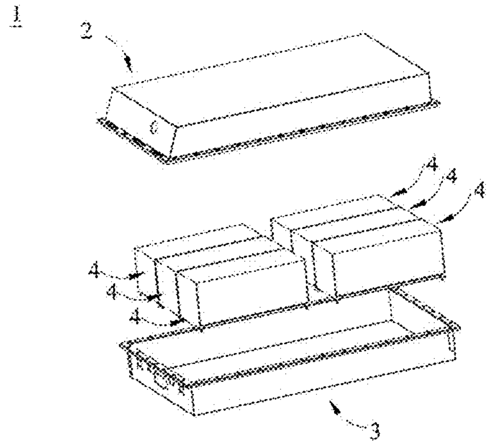
FIG. 6 is an exploded view of FIG. 5.

FIG. 5 and FIG. 6 show a battery pack 1 as an example. Referring to FIG. 5 and FIG. 6, the battery pack 1 may contain a battery box and a plurality of battery modules 4 disposed in the battery box. The battery box includes an upper box 2 and a lower box 3. The upper box 2 is configured to fit and cover the lower box 3 to form a closed space for accommodating the battery modules 4. The plurality of battery modules 4 may be arranged in the battery box in any manner.

Electrical Device

An embodiment of this application further provides an electrical device. The electrical device includes at least one of the secondary battery, the battery module, or the battery pack according to this application. The secondary battery, the battery module, or the battery pack may be used as a power supply of the electrical device, or used as an energy storage unit of the electrical device. The electrical device may be, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The secondary battery, the battery module, or the battery pack may be selected for the electrical device according to practical requirements of the electrical device.

Figure 7:
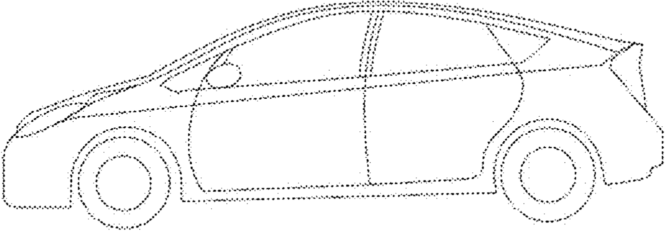
FIG. 7 is a schematic diagram of an electrical device that uses a secondary battery as a power supply according to an embodiment of this application.

FIG. 7 shows an electrical device as an example. The electrical device may be a battery electric vehicle, a hybrid electric vehicle, a plug-in hybrid electric vehicle, or the like. A battery pack or a battery module may be employed to meet the requirements of the electrical device for a high power and a high energy density.

In another example, the electrical device may be a mobile phone, a tablet computer, a notebook computer, or the like. The electrical device is generally required to be thin and light, and may employ a secondary battery as a power supply.

Embodiments

The following embodiments are more detailed descriptions of the content disclosed herein. The embodiments are merely intended as illustrative descriptions because it is apparent that a person skilled in the art may make various modifications and changes to such embodiments within the scope of the content disclosed herein. Unless otherwise specified, all fractions, percentages, and ratios mentioned in the following embodiments are values by weight. All reagents used in the embodiments are commercially available or can be synthesized according to conventional methods, and can be directly put into use without a need of further processing. All the instruments used in the embodiments are commercially available.

Embodiment 1

Preparing a Positive Electrode Plate

Mixing $LiNi_{0.5}Co_{0.2}Mn_{0.3}O_2$ (NCM523) as a positive active material, acetylene black as a conductive agent, and polyvinylidene difluoride (PVDF) as a binder at a mass ratio of 96:2:2 in a solvent of N-methyl-pyrrolidone (NMP), stirring with a vacuum mixer until the solution system becomes homogeneous so that a positive slurry is obtained; coating a positive current collector aluminum foil with the positive slurry evenly; air-drying the aluminum foil under a room temperature and moving it into an oven for further drying, and then performing cold pressing and slitting to obtain a positive electrode plate.

Preparing a Negative Electrode Plate

Mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4 in deionized water, and stirring the mixture with a vacuum mixer until a homogeneous state to obtain a first negative slurry.

Mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, blending the mixture with simple-substance Ag particles (with a volume median diameter $D_{v50}$ being 0.05 μm) at a mass ratio of 98:2, adding deionized water, and stirring the mixture with a vacuum mixer until a homogeneous state to obtain a second negative slurry.

Coating both sides of the negative current collector copper foil with the first negative slurry and the second negative slurry evenly at a time; air-drying the copper foil under a room temperature, and moving the copper foil into an oven for further drying, and then performing cold pressing and slitting to obtain a negative electrode plate. The second negative film layer is located between the negative current collector and the first negative film layer. The coating weight of the first negative film layer is 4.3 $mg/cm^2$, and the coating weight of the second negative film layer is 6.7 $mg/cm^2$. The mass percent of the simple-substance Ag particles in the second negative film layer is 2%.

Preparing an Electrolytic Solution

Mixing ethylene carbonate (EC), ethyl methyl carbonate (EMC), and diethyl carbonate (DEC) at a volume ratio of 1:1:1 to obtain an organic solvent, and then dissolving thoroughly dried lithium salt $LiPF_6$ in the organic solvent to formulate an electrolytic solution in which the concentration of $LiPF_6$ is 1 mol/L.

Preparing a Separator

Using a polyethylene film as a separator.

Preparing a Secondary Battery

Stacking the positive electrode plate, the separator, and the negative electrode plate in sequence so that the separator is located between the positive electrode plate and the negative electrode plate to serve a purpose of isolation, and then winding the stacked plates to obtain an electrode assembly; placing the electrode assembly into an outer package, performing drying and then injecting an electrolytic solution, and performing steps such as vacuum sealing, standing, chemical formation, and shaping to obtain a secondary battery.

Embodiment 2

The method for preparing a secondary battery is similar to Embodiment 1, and different steps are: mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, blending the mixture with simple-substance Ag particles (with a volume median diameter $D_{v50}$ being 0.05 μm) at a mass ratio of 97:3, adding deionized water, and stirring the mixture with a vacuum mixer until a homogeneous state to obtain a second negative slurry. The mass percent of the simple-substance Ag particles in the second negative film layer is 3%.

Embodiment 3

The method for preparing a secondary battery is similar to Embodiment 1, and different steps are: mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, blending the mixture with simple-substance Ag particles (with a volume median diameter $D_{v50}$ being 0.05 μm) at a mass ratio of 95:5, adding deionized water, and stirring the mixture with a vacuum mixer until a homogeneous state to obtain a second negative slurry. The mass percent of the simple-substance Ag particles in the second negative film layer is 5%.

Embodiment 4

The method for preparing a secondary battery is similar to that in Embodiment 1, and different steps are: mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, blending the mixture with simple-substance Ag particles (with a volume median diameter $D_{v50}$ being 0.05 μm) at a mass ratio of 90:10, adding deionized water, and stirring the mixture with a vacuum mixer until a homogeneous state to obtain a second negative slurry. The mass percent of the simple-substance Ag particles in the second negative film layer is 10%.

Embodiment 5

The method for preparing a secondary battery is similar to that in Embodiment 1, and different steps are: mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, blending the mixture with simple-substance Al particles (with a volume median diameter $D_{v50}$ being 0.05 μm) at a mass ratio of 95:5, adding deionized water, and stirring the mixture with a vacuum mixer until a homogeneous state to obtain a second negative slurry. The mass percent of the simple-substance Al particles in the second negative film layer is 5%.

Embodiment 6

The method for preparing a secondary battery is similar to Embodiment 1, and different steps are: mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, blending the mixture with simple-substance Mg particles (with a volume median diameter $D_{v50}$ being 0.05 μm) at a mass ratio of 95:5, adding deionized water, and stirring the mixture with a vacuum mixer until a homogeneous state to obtain a second negative slurry. The mass percent of the simple-substance Mg particles in the second negative film layer is 5%.

Embodiment 7

The method for preparing a secondary battery is similar to that in Embodiment 1, and different steps are: mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, blending the mixture with simple-substance Nb particles (with a volume median diameter $D_{v50}$ being 0.05 μm) at a mass ratio of 95:5, adding deionized water, and stirring the mixture with a vacuum mixer until a homogeneous state to obtain a second negative slurry. The mass percent of the simple-substance Nb particles in the second negative film layer is 5%.

Comparative Embodiment 1

The method for preparing a secondary battery is similar to that in Embodiment 1, and differs in the process of preparing the negative electrode plate, specifically including the following steps.

Mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, adding deionized water, and stirring the mixture with a vacuum mixer until a homogeneous state to obtain a negative slurry. Dividing the negative slurry into two parts, one being a first negative slurry and the other being a second negative slurry. Coating both sides of the negative current collector copper foil with the first negative slurry and the second negative slurry evenly at a time; air-drying the copper foil under a room temperature, and moving the copper foil into an oven for further drying, and then performing cold pressing and slitting to obtain a negative electrode plate. The second negative film layer is located between the negative current collector and the first negative film layer. The coating weight of the first negative film layer is 4.3 mg/cm$^2$, and the coating weight of the second negative film layer is 6.7 mg/cm$^2$.

Comparative Embodiment 2

The method for preparing a secondary battery is similar to that in Embodiment 1, and differs in the process of preparing the negative electrode plate, specifically including the following steps.

Mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, blending the mixture with simple-substance Ag particles (with a volume median diameter $D_{v50}$ being 0.05 μm) at a mass ratio of 95:5, adding deionized water, and stirring the mixture with a vacuum mixer until a homogeneous state to obtain a negative slurry. Coating both sides of the negative current collector copper foil with the negative slurry evenly; air-drying the copper foil under a room temperature, and moving the copper foil into an oven for further drying, and then performing cold pressing and slitting to obtain a negative electrode plate. The coating weight of the negative film layer is 11.0 mg/cm$^2$.

Comparative Embodiment 3

The method for preparing a secondary battery is similar to that in Embodiment 1, and differs in the process of preparing the negative electrode plate, specifically including the following steps.

Mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, blending the mixture with simple-substance Ag particles (with a volume median diameter $D_{v50}$ being 0.05 μm) at a mass ratio of 95:5, adding deionized water, and stirring the mixture with a vacuum mixer until a homogeneous state to obtain a first negative slurry.

Mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, adding deionized water, and stirring the mixture with a vacuum mixer until a homogeneous state to obtain a second negative slurry.

Coating both sides of the negative current collector copper foil with the first negative slurry and the second negative slurry evenly at a time; air-drying the copper foil under a room temperature, and moving the copper foil into an oven for further drying, and then performing cold pressing and slitting to obtain a negative electrode plate. The second negative film layer is located between the negative current collector and the first negative film layer. The coating weight of the first negative film layer is 4.3 mg/cm$^2$, and the coating weight of the second negative film layer is 6.7 mg/cm$^2$. The mass percent of the simple-substance Ag particles in the first negative film layer is 5%.

Comparative Embodiment 4

The method for preparing a secondary battery is similar to that in Embodiment 1, and different steps are: mixing graphite as a negative active material, acetylene black as a conductive agent, sodium carboxymethyl cellulose (CMC-Na) as a thickener, and styrene butadiene rubber (SBR) as a binder at a mass ratio of 96.4:1:1.2:1.4, blending the mixture with simple-substance Ni particles (with a volume median diameter $D_{v50}$ being 0.05 μm) at a mass ratio of 95:5, adding deionized water, and stirring the mixture with a vacuum mixer until a homogeneous state to obtain a second negative slurry. The mass percent of the simple-substance Nb particles in the second negative film layer is 5%.

Tests (1) Testing the Maximum Charge Rate of a Secondary Battery

Discharging a secondary battery at a constant current rate of 1 C at 25° C. until the voltage drops to 2.8 V. Subsequently, charging the battery at a constant current rate of 1 C until the voltage reaches 4.2 V, and continuing to charge the battery at a constant voltage until the current reaches 0.05 C so that the secondary battery enters a fully charged state. Leaving the fully charged secondary battery to stand for 5 minutes, and discharging the battery to 2.8 V at a constant current rate of 1 C. The discharge capacity at this time is an actual capacity of the secondary battery under a 1 C rate, denoted as C0. Charging the secondary battery at a constant current of x C0 rate (representing gradient charge rate such as 1 C0, 1.1 C0, 1.2 C0, 1.3 C0, 1.4 C0, and so on) until the voltage reaches 4.2 V, and then continuing to charge the battery at a constant voltage until the current reaches 0.05 C0, and leaving the battery to stand for 5 minutes. Disassembling the secondary battery, and checking for lithium plating on the surface of the negative electrode plate. If no lithium is precipitated on the surface of the negative electrode plate, increasing the charge rate and testing again until lithium is precipitated on the surface of the negative electrode plate. Recording the maximum charge rate when no lithium is precipitated on the surface of the negative electrode plate.

(2) Testing Overcharge Performance of the Secondary Battery

Discharging a secondary battery at a constant current rate of 1 C at 25° C. until the voltage drops to 2.8 V. Subsequently, charging the battery at a constant current of 1 C rate at intervals that increase at a gradient of 1 h, 1.1 h, 1.2 h, 1.3 h, 1.4 h, and so on. Disassembling the secondary battery at the end of each charge process, checking for lithium plating on the surface of the negative electrode plate, and recording a charging duration t (h) when the surface of the negative electrode plate just begins to precipitate lithium. Using "charging duration t×100%" to represent the SOC of the secondary battery for the period from overcharging to the start of precipitating lithium.

(3) Testing the Cycle Performance of a Secondary Battery

Discharging a secondary battery at a constant current rate of 1 C at 25° C. until the voltage drops to 2.8 V. Charging the secondary battery at a constant current of 1 C rate until the voltage reaches 4.2 V, and continuing to charge the battery at a constant voltage until the current reaches 0.05 C so that the secondary battery is in a fully charged state at this time. Recording the charge capacity at this time as a 1$^{st}$-cycle charge capacity; leaving the battery to stand for 5 minutes, and then discharging the battery at a constant current of 1 C rate until the voltage reaches 2.8 V, thereby completing one charge-and-discharge cycles. Recording the discharge capacity at this time as a 1$^{st}$-cycle discharge capacity. Repeating the charge-and-discharge cycle of the secondary battery in the way described above, and recording the discharge capacity at the end of each cycle until the discharge capacity of the secondary battery fades to 80% of the 1$^{st}$-cycle discharge capacity. Using the number of cycles at this time to represent the cycle performance of the secondary battery under a 1 C rate condition. The higher the number of cycles of the secondary battery, the higher the cycle performance.

Discharging a secondary battery at a constant current rate of 1 C at 25° C. until the voltage drops to 2.8 V. Charging the secondary battery at a constant current of 3 C rate until the voltage reaches 4.2 V, and continuing to charge the battery at a constant voltage until the current reaches 0.05 C so that the secondary battery is in a fully charged state at this time. Recording the charge capacity at this time as a 1$^{st}$-cycle charge capacity; leaving the battery to stand for 5 minutes, and then discharging the battery at a constant current of 3 C rate until the voltage reaches 2.8 V, thereby completing one charge-and-discharge cycles. Recording the discharge capacity at this time as a 1$^{st}$-cycle discharge capacity. Repeating the charge-and-discharge cycle of the secondary battery in the way described above, and recording the discharge capacity at the end of each cycle until the discharge capacity of the secondary battery fades to 80% of the 1$^{st}$-cycle discharge capacity. The number of cycles at this time is used to represent the cycle performance of the secondary battery under a 3 C rate condition. The higher the number of cycles of the secondary battery, the higher the cycle performance.

Detailed parameters of Embodiments 1 to 7 and Comparative Embodiments 1 to 4 are shown in Table 1, and detailed test results are shown in Table 2.

TABLE 1

| Serial number | Coating weight of first negative film layer (mg/cm$^2$) | Coating weight of second negative film layer (mg/cm$^2$) | Metal particle | $\left\|\frac{r_M - r_{Li}}{r_{Li}}\right\| \times 100\%$ | Location of M | Mass percent of M |
|---|---|---|---|---|---|---|
| Embodiment 1 | 4.3 | 6.7 | Ag | 5.3% | Second negative film layer | 2% |
| Embodiment 2 | 4.3 | 6.7 | Ag | 5.3% | Second negative film layer | 3% |
| Embodiment 3 | 4.3 | 6.7 | Ag | 5.3% | Second negative film layer | 5% |
| Embodiment 4 | 4.3 | 6.7 | Ag | 5.3% | Second negative film layer | 10% |
| Embodiment 5 | 4.3 | 6.7 | Al | 5.9% | Second negative film layer | 5% |
| Embodiment 6 | 4.3 | 6.7 | Mg | 5.3% | Second negative film layer | 5% |
| Embodiment 7 | 4.3 | 6.7 | Nb | 3.9% | Second negative film layer | 5% |
| Comparative Embodiment 1 | 4.3 | 6.7 | / | / | / | / |
| Comparative Embodiment 2 | Single negative film layer, 11.0 | | Ag | 5.3% | Single negative film layer | 5% |
| Comparative Embodiment 3 | 4.3 | 6.7 | Ag | 5.3% | First negative film layer | 5% |
| Comparative Embodiment 4 | 4.3 | 6.7 | Ni | 18.4% | Second negative film layer | 5% |

TABLE 2

| Serial number | Maximum charge rate | SOC for period from overcharging to start of precipitating lithium | Number of cycles 1 C | Number of cycles 3 C |
|---|---|---|---|---|
| Embodiment 1 | 4 C0 | 110% | 2500 | 2000 |
| Embodiment 2 | 5 C0 | 130% | 2500 | 2000 |
| Embodiment 3 | 5 C0 | 130% | 2500 | 2000 |
| Embodiment 4 | 5 C0 | 130% | 2000 | 1500 |
| Embodiment 5 | 5 C0 | 125% | 2480 | 1490 |
| Embodiment 6 | 5 C0 | 128% | 2490 | 1490 |
| Embodiment 7 | 5 C0 | 125% | 2490 | 1500 |
| Comparative Embodiment 1 | 3 C0 | 100% | 2000 | 1500 |
| Comparative Embodiment 2 | 3 C0 | 100% | 2000 | 1500 |
| Comparative Embodiment 3 | 3 C0 | 100% | 2000 | 1500 |
| Comparative Embodiment 4 | 2 C0 | 100% | 1600 | 1300 |

Figure 8:
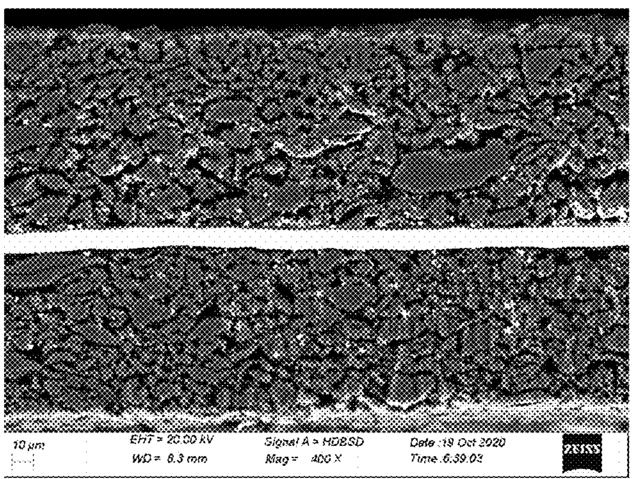
FIG. 8 shows a cross-section polishing scanning electron microscope image of a negative electrode plate according to Embodiment 1.

As can be seen from the data in Table 2, the secondary battery according to this application achieves a higher maximum charge rate and higher overcharge performance, and can effectively solve the problem of lithium plating of the secondary battery charged at a high rate or overcharged, and significantly improve the kinetic performance, cycle performance, and safety performance of the secondary battery. FIG. 8 shows a cross-section polishing scanning electron microscope image of a negative electrode plate according to Embodiment 1. As can be seen from FIG. 8, simple-substance Ag particles are uniformly distributed in the body portion of the second negative film layer. The surface of Ag serves as a preferred nucleation site of lithium metal, so as to bring an effect of inducing the lithium metal to nucleate on the surface of Ag in the second negative film layer, and effectively suppress the precipitation of lithium metal on the surface of the negative electrode plate. Therefore, the secondary battery still exhibits high kinetic performance and high safety performance even if charged at a high rate or overcharged, and the cycle performance of the secondary battery is higher.

No metal particles are added into the negative film layer in Comparative Embodiment 1, and the negative film layer contains no nucleation sites, thereby being unable to effectively suppress the precipitation of lithium metal on the surface of the negative electrode plate, and exhibiting low kinetic performance and low cycle performance of the secondary battery charged at a high rate and overcharged.

The negative film layer in Comparative Embodiment 2 is a single layer, and simple-substance Ag particles are added into the negative film layer. The surface of Ag can serve as a preferred nucleation site for lithium metal. However, because the simple-substance Ag particles are uniformly distributed in the negative film layer, no effect is exerted in suppressing the precipitation of lithium metal on the surface of the negative electrode plate, and therefore, both the kinetic performance and cycle performance of the secondary battery charged at a high rate or overcharged are inferior. No metal particles are added into the second negative film layer in Comparative Embodiment 3, and simple-substance Ag particles are added in the first negative film layer. The surface of Ag can serve as a preferred nucleation site for lithium metal. However, because the simple-substance Ag particles are uniformly distributed in the first negative film layer, no effect is exerted in suppressing the precipitation of lithium metal on the surface of the negative electrode plate, and therefore, both the kinetic performance and cycle performance of the secondary battery charged at a high rate or overcharged are inferior.

In Comparative Embodiment 4, the metal particles added into the second negative film layer are simple-substance Ni particles. The atomic radius differs excessively between Ni and Li. The surface of Ni is unable to serve as a preferred nucleation site of Li, thereby being unable to exert an effect of inducing Li to nucleate on the surface of Ni in the second negative film layer, and unable to effectively suppress the precipitation of lithium metal on the surface of the negative electrode plate. The kinetic performance of the secondary battery charged at a high rate or overcharged is poor, and the secondary battery can hardly achieve a longer cycle life.

What is described above is merely specific embodiments of this application, but is not intended to limit the protection scope of this application. Various equivalent modifications and replacements conceivable by any person skilled in the art without departing from the technical scope disclosed herein undoubtedly fall within the protection scope of this application. Therefore, the protection scope of this application is subject to the protection scope of the claims.

What is claimed is:

1. A negative electrode plate, comprising:

a negative current collector; and a negative film layer disposed on the negative current collector, wherein the negative film layer comprises a first negative film layer and a second negative film layer, the second negative film layer is located between the negative current collector and the first negative film layer, the second negative film layer comprises a metal element M, and an atomic radius $r_M$ of M and an atomic radius $r_{Li}$ of Li satisfy $$0 < \left|\frac{r_M - r_{Li}}{r_{Li}}\right| \times 100\% \leq 12\%,$$

wherein the second negative film layer comprises a body portion, a first surface, and a second surface opposite to the first surface along a thickness direction of the second negative film layer, the first surface is disposed back from the negative current collector, the second surface is disposed toward the negative current collector, M is located on the first surface or the second surface or both, a layered structure of M is formed on the first surface or the second surface or both, M is distributed at intervals or in an array on the first surface or the second surface or both, the layered structure of M is discontinuous.

2. The negative electrode plate according to claim 1, wherein M is one or more selected from Sn, Bi, Cd, Ti, Nb, Ta, Sb, Hf, Mg, Zr, Ag, Au, Al, Sc, Mo, W, Pt, Pd, In, Re, Ir, Ga, Os, V, Zn, Ru, and Rh.

3. The negative electrode plate according to claim 2, wherein M is one or more selected from Cd, Ta, Hf, Au, Sc, Mo, W, Re, Ir, Os, V, Ru, and Rh.

4. The negative electrode plate according to claim 1, wherein M is further located in at least a body portion of the second negative film layer.

5. The negative electrode plate according to claim 1, wherein, based on a total mass of the second negative film layer, a mass percent of M is 3% to 7%.

6. The negative electrode plate according to claim 5, wherein, based on a total mass of the second negative film layer, the mass percent of M is 3% to 5%.

7. The negative electrode plate according to claim 1, wherein, the first negative film layer comprises the metal element M, based on a total mass of the first negative film layer, a mass percent of M is greater than 0 and less than or equal to 0.5%.

8. The negative electrode plate according to claim 1, wherein the first negative film layer contains no metal element M.

9. The negative electrode plate according to claim 1, wherein, a coating weight ratio between the first negative film layer and the second negative film layer is 0.3 to 1.2.

10. The negative electrode plate according to claim 1, wherein, the second negative film layer comprises a metal particle, and the metal particle is a simple-substance particle of M.

11. The negative electrode plate according to claim 1, wherein the second negative film layer comprises a metal particle, the metal particle is an alloy of M, the alloy of M comprises one or more of an alloy formed by at least two elements of M, or an alloy formed by one or more elements of M and one or more elements of another metal element $M^1$, $M^1$ is selected from Fe, Cu, Ni, Cr, or Mn.

12. The negative electrode plate according to claim 10, wherein a volume median diameter $D_{v50}$ of the metal particle is less than or equal to 5 μm.

13. The negative electrode plate according to claim 1, wherein, the second negative film layer comprises one or more of a Li-M alloy particle or a Li-M-$M^1$ alloy particle, $M^1$ represents a metal element different from M, and $M^1$ comprises one or more of Fe, Cu, Ni, Cr, or Mn.

14. The negative electrode plate according to claim 1, wherein, the atomic radius $r_M$ of M and the atomic radius $r_{Li}$ of Li satisfy $$0 < \left|\frac{r_M - r_{Li}}{r_{Li}}\right| \times 100\% \leq 6\%.$$

15. The negative electrode plate according to claim 1, wherein M is located on both the first surface and the second surface.

16. The negative electrode plate according to claim 1, wherein M is distributed at intervals or in an array on the first surface and the second surface, the layered structure of M on the first surface and the layered structure of M on the second surface are discontinuous.

17. The negative electrode plate according to claim 1, wherein the body portion of the second negative film layer is free from M.

18. A secondary battery, comprising the negative electrode plate according to claim 1.

19. An electrical device, comprising at least one of the secondary battery according to claim 18.

20. A negative electrode plate, comprising:

a negative current collector; and a negative film layer disposed on the negative current collector, wherein the negative film layer comprises a first negative film layer and a second negative film layer, the second negative film layer is located between the negative current collector and the first negative film layer, the second negative film layer comprises a metal element M, and an atomic radius $r_M$ of M and an atomic radius $r_{Li}$ of Li satisfy $$0 < \left|\frac{r_M - r_{Li}}{r_{Li}}\right| \times 100\% \leq 12\%,$$

wherein the second negative film layer comprises a body portion, a first surface, and a second surface opposite to the first surface along a thickness direction of the second negative film layer, the first surface is disposed back from the negative current collector, the second surface is disposed toward the negative current collector, M is located on the first surface or the second surface or both, a layered structure of M is formed on the first surface or the second surface or both, wherein the body portion of the second negative film layer is free from M.

* * * * *